April 21, 1970  A. J. MacDONALD  3,507,229
APPARATUS FOR INHIBITING ENTRY
Filed Feb. 9, 1968  2 Sheets-Sheet 1
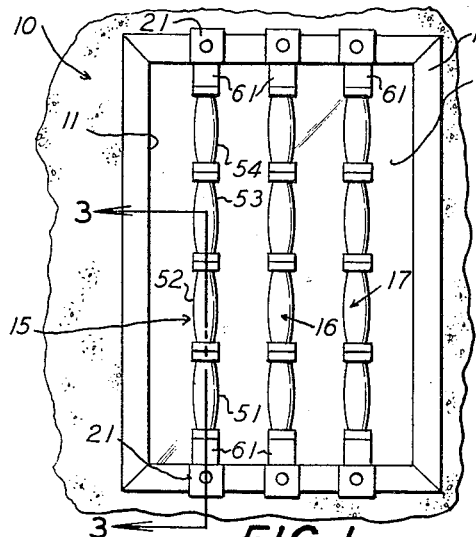
FIG. 1.
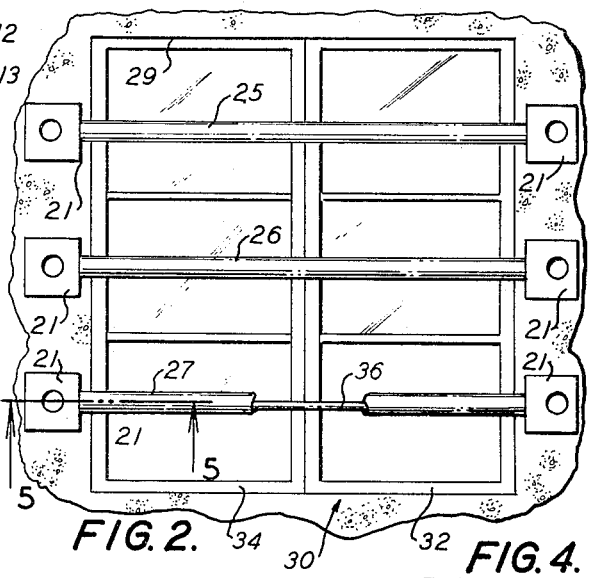
FIG. 2.
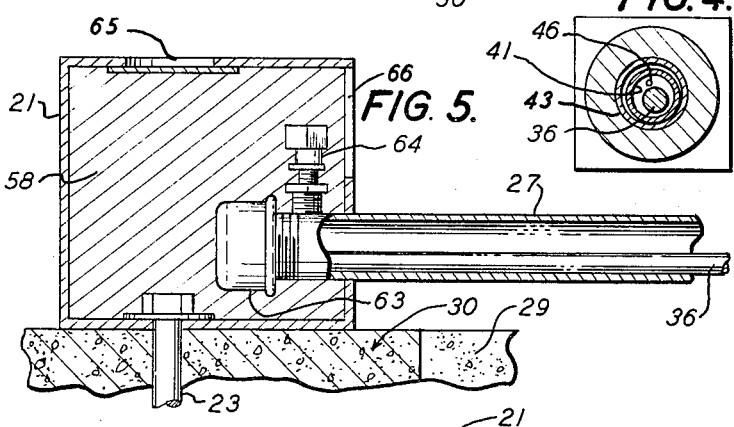
FIG. 3.  FIG. 5.  FIG. 4.
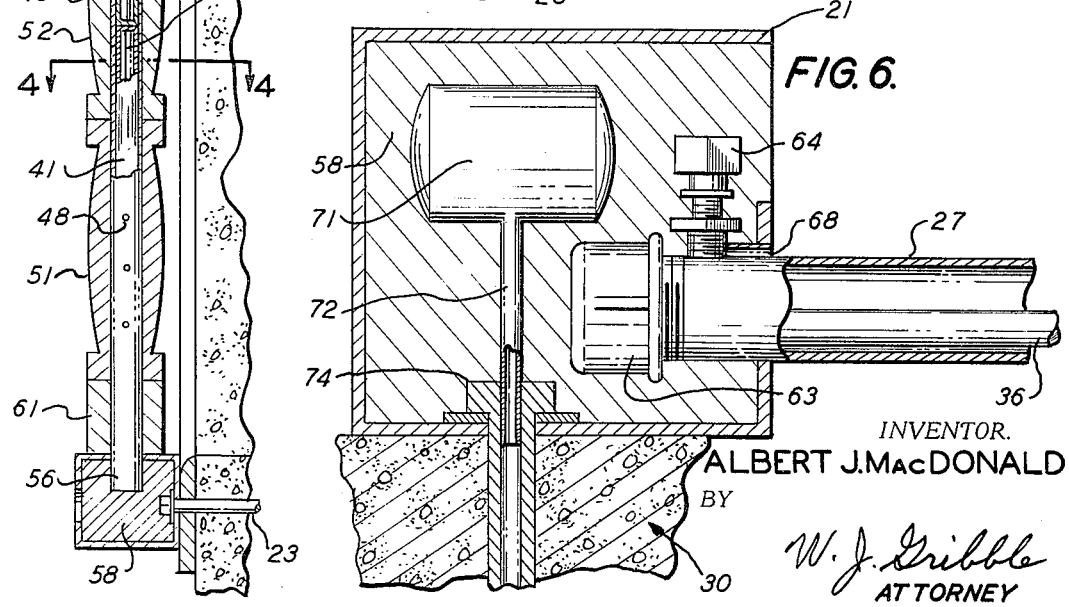
FIG. 6.
INVENTOR.
ALBERT J. MacDONALD
BY
W. J. Gribble
ATTORNEY

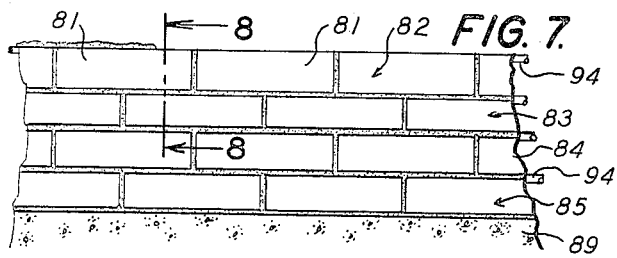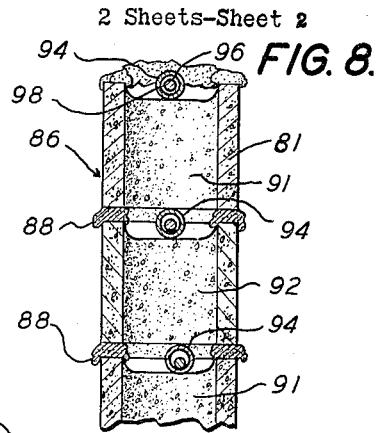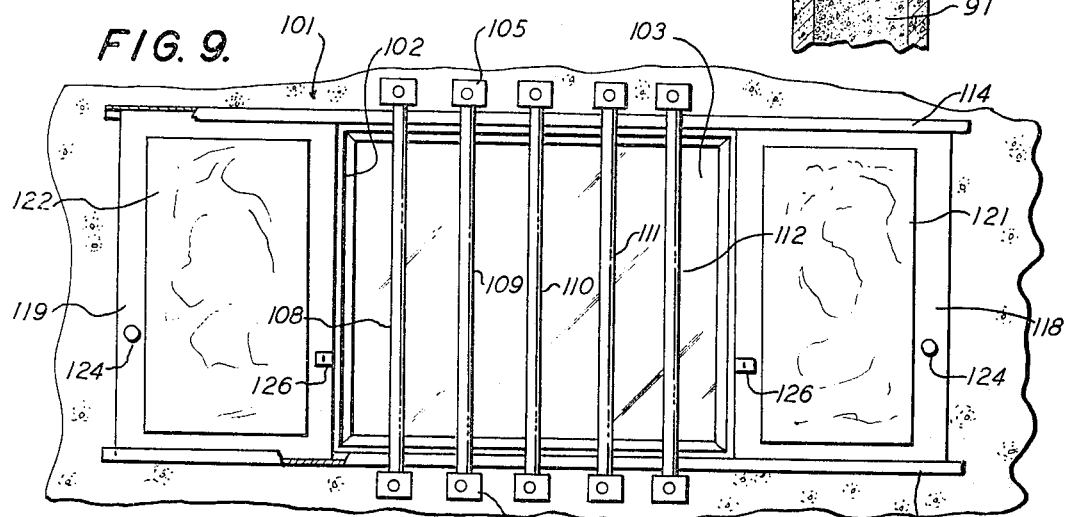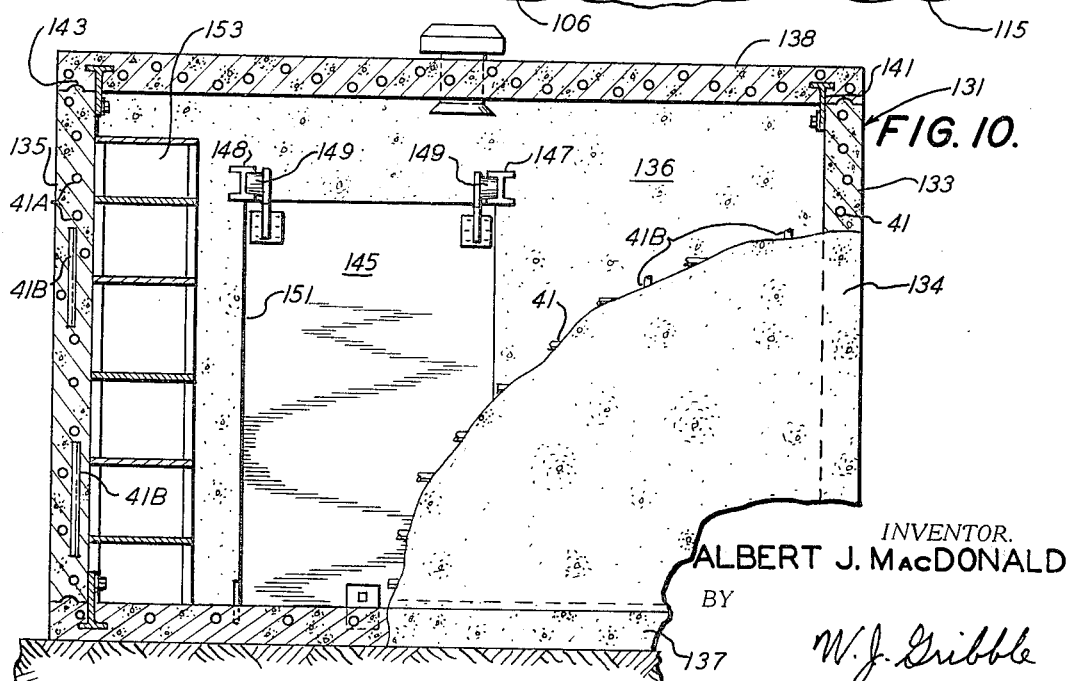

United States Patent Office 3,507,229
Patented Apr. 21, 1970

3,507,229
APPARATUS FOR INHIBITING ENTRY
Albert J. MacDonald, Van Nuys, Calif., assignor to Wisdom Clubs of America, Inc., Los Angeles, Calif., a corporation of California
Filed Feb. 9, 1968, Ser. No. 704,338
Int. Cl. E05g 3/00; G08b 15/02
U.S. Cl. 109—29
1 Claim

ABSTRACT OF THE DISCLOSURE

Barrier tubes combined with walled structures across possible structure areas of entry. The tubes are anchored in or to the structure. Each tube contains activity-inhibiting gas under pressure. The gas may be free in the tube or further confined within the barrier tube in a capsule with a frangible wall. A hardened steel rod extends within the capsule or tube the length thereof. The rod is free to roll or rotate with respect to its container. The barrier tubes may be surrounded by structural walls or by ornamental shrouds.

Background of the invention

Mechanical apparatus for penetrating structures has advanced with other phases of our technology. Strength of materials or intricacies of locking mechanisms no longer effectively deter unlawful intrusion of structures. Bolt cutters, cutting torches, diamond saws and jacks all are portable in the extreme and able to defeat conventional entry barriers. What has been needed is a barrier to entry which not only resists destruction but which also attacks the person employing the destructive tools.

Summary of the invention

My invention contemplates apparatus to inhibit unauthorized entry through windows, skylights, doors or walls which comprises elongate barriers anchored to or in the structure at expected points of entry. Such points may be conventional openings such as windows, or destructive openings in exterior walls, roofs or floors. Each barrier is spaced from an adjoining barrier an increment small enough to preclude passage of a person between parallel barriers. Each barrier encloses a gas charge. The gas may be free in the barrier or be contained in a frangible cartridge.

Preferably the gas that fills the barrier or cartridge is one of a number of commercially available fire-fighting preparations which also inhibit human activity. One such material is Du Pont's "Freon 12" which is available in compressed storage tanks and which immediately chills the area of its emission below the point where human activity is possible.

Another fluid that can be effectively used with the apparatus of the invention is the foam detergent commonly used at airports both as a fire fighter and as a skid base for disabled aircraft. This foam material expands upon release to create a billowing pile within which physical activity is practically impossible. Both the foam and Freon 12 deteriorate to a powder which is removed by vacuum cleaning.

In the preferred embodiment of the invention each of the barriers contains a hardened steel rod that is free to move and roll within the barrier about its longitudinal axis. The rod has two functions. First, it prevents the barrier containing the fluid or gas from being cleanly pinched off, as might be done with bolt cutters, to prevent expulsion of the contained fluid. Secondly, the rod will still bar entry through the space even after the outer barrier tube has been severed. Since the rod is free to move within the barrier, it merely rotates or spins in place when reciprocating or rotating saw blades or abrasive cutting tools atack it. When pinching type cutters are used on the barrier, the rod is wedged to the side of the barrier remote from the tool so that the least powerful portion of the pinching jaws operates upon the rod.

These and other advantages of the invention are apparent from the following detailed description and the drawing.

Brief description of the drawing

FIG. 1 is a fragmentary elevational view showing the invention employed at the window of a structure;

FIG. 2 is an alternate embodiment of the invention shown in elevation in place at a window;

FIG. 3 is a fragmentary sectional elevation taken along line 3—3 of FIG. 1;

FIG. 4 is a sectional plan view taken along line 4—4 of FIG. 3;

FIG. 5 is a fragmentary bottom plan section taken along line 5—5 of FIG. 2;

FIG. 6 is a fragmentary sectional view similar to FIG. 5 of a further alternate embodiment of the invention;

FIG. 7 is a fragmentary elevation of a structural wall employing the invention;

FIG. 8 is a transverse sectional elevation taken along line 8—8 of FIG. 7;

FIG. 9 is a fragmentary elevational view of the interior of a structure with the apparatus of the invention at a window; and FIG. 10 is an elevational view, partly in section, of a further alternate embodiment of the invention.

In the figures like parts are given like reference characters.

In FIG. 1 a structure designated generally by the character 10 has an opening 11 surrounded by inside frames 12 and covered by a glass pane 13. Vertical barriers 15, 16, 17 are secured across the opening from top to bottom. Each of the barriers terminates at each end in a safety box 21 secured to the structure 10 by means of an anchor bolt 23 (see FIG. 3).

The space between barriers is such as to preclude entry between the barriers if pane 13 is removed.

In FIG. 2 horizontal barriers 25, 26, 27 extend across an opening 29 in a structure designated generally by the numeral 30. The opening is covered by hinged windows 32, 34.

Each barrier terminates at each end in a safety box 21 secured to the structure by bolts 23.

In the embodiments of FIG. 1 and FIG. 2 each of the barriers is independently secured across the structure opening. Each barrier has an outer casing or tube enclosing a quantity of gas under pressure. The gas may be one which medically affects an intruder who comes in contact with it or may be one which results in an activity-inhibiting foam or powder like Freon 12 by Du Pont, or fire fighting foams or powders.

Each of the barriers of each embodiment also encloses a hardened steel rod 36 free to rotate with respect to the element which encloses it so as to inhibit cutting through the barrier.

Description of the preferred embodiment

In the embodiment of FIG. 1 the contained gas is encapsulated within a frangible cylindrical cartridge such as the cartridge 41 of FIGS. 3 and 4. A metal tube 43 extends between safety boxes at either end of the barrier bar and holds a plurality of gas encapsulating cartridges 41, 41A, which abut end to end within the metal tube. Each frangible cartridge, which may be made of material such as glass or a brittle plastic, contains a hardened rod 36 which extends the full length of the cartridge. The rod is freely rotatable within the frangible cartridge and is surrounded by the compressed gas, represented in FIG. 4 by the dot 46.

As can be seen from FIGS. 1 and 3, the metal tube 43 may be encompassed by a plurality of wooden spools 51, 52, 53, 54, whose individual lengths differ from the lengths of the frangible gas-containing cartridges. The extreme ends 56 of the metal tube extend into the safety boxes and are anchored there by a hardened fill 58 which is poured into the safety box after anchor bolt 23 has secured the box and the barrier across the structure opening. Terminal wooden spacers 61 of varying height adjust the total length of the spools to the various opening sizes which occur. The wooden spools are ornamental as well as protective and may vary in design and length. However, a spool of standard length may be economically desirable when used with terminal spools of varying length.

The frangible gas-containing cartridges 41 with their contained steel rods may also be of varying standard lengths so that they may be combined to approximate closely the spanned width of the structure opening. The embodiment of FIG. 1, therefore, illustrates an embodiment of the invention wherein barriers comprise a plurality of gas-filled frangible cartridges each containing a steel rod and encased within a metal tube which is fixed at each of its ends within safety boxes and encompassed by wooden spools.

In the embodiment of FIGS. 2 and 5 barriers 25, 26 and 27 may be heavy tubes wtih threaded and capped ends terminating in the safety boxes 21. Each barrier contains a hardened rod 36.

As can be seen from FIG. 5, the end of the barrier within the shell of safety box 21 has a filler 64 which is plugged. The box contains a hardened fill 58 that surrounds end cap 63 of the barrier, filler 64 and the head of box bolt 23. The fill may be cement, lead, epoxy, or other like materials that may be poured into the box after it is secured to the structure to prevent tampering wih the barrier filler or bolt 23.

Access opening 65, 66 in the walls of the safety box permit pre-fill access to bolt 23 and the box interior.

The embodiment of FIG. 6 includes two safeguards against tampering with the safety box-carrier relationship. A vial or cartridge 71 of fluid of the types described resides within the box. A channel pipe 72 connects the contents of the cartridge to the interior of a hollow bolt 74. The bolt 74 performs the functions of the previously described bolts 23. Any severance of bolt 74 results in discharge of the fluid of cartridge 71 at the point of severance.

A duct 68 extends through fill 58 to the exterior of the safety box adjacent the barrier. Torquing of the barrier tends to dislodge filler 64 from the barrier, since the filler is held in fill 58 within the box. Rupture of the filler from the barrier results in fluid flow from duct 68 into the area immediate the barrier, inhibiting further destruction of the box-barrier bond.

FIGS. 7 and 8 illustrate a use of the invention including conventional hollow cement blocks. A plurality of such blocks 81 is arranged one upon the other in courses 82, 83, 84, 85 to comprise a structure wall 86. Each course is fixed to the next lower course by a conventional mortar joint 88. The blocks rest upon a foundation wall 89.

As can be seen in FIG. 8, each block has a transverse central wall 91 and transverse end walls, such as the wall 92. The top of each transverse wall is recessed below the top of the longitudinal walls of the hollow block. A gas-filled tube 94 resides in the space between the upper block and the recess in the transverse walls.

The tubes are similar to those shown in FIG. 3 and comprise a metallic outer tube 96 and a gas-filled inner frangible tube 98 within which a freely rotatable hardened steel rod (not shown) resides. The gas which fills the frangible inner tube may be of any of the types heretofore discussed.

The tubes may be of various lengths. The tubes may be positioned with respect to the center of the hollow blocks to avoid interfering with horizontal or vertical structural steel and the filling of the block cells with grout.

It can be seen from FIGS. 7 and 8 that any attempt to pierce the wall or remove a particular block in order to gain entry to the structure results in breakage of the frangible tube. Even after the possible dissipation of the inhibiting contained gas, the hardened steel bar resists attempts to saw through it and further inhibit entry.

In FIG. 9 a structure 101 has a window opening 102 closed by a framed glass 103. A plurality of safety boxes 105 and 106 on upper and lower edges of the window opening respectively secure barriers 108, 109, 110, 111 and 112 across the window opening to impede entry should glass 103 be destroyed or removed. The barriers 108 through 112 may be of the type shown in FIGS. 2 and 5 but are preferably of the ornamental type shown in FIGS. 1 and 3. In any case, the enclosed frangible tubes filled with activity-inhibiting gas extend vertically across the window opening, with their joints, if any, concealed by the outer enclosure of the barriers.

Upper and lower channel rails 114, 115 are secured adjacent the safety boxes between the barriers and the structure. A pair of sliding steel panels 118, 119 are restrained by the rails. Each panel may have a decorative section, such as the sections 121, 122, mounted on a steel panel to improve the decor of the structure enclosure. Paintings may be fastened to the panels or chalk board may be substituted for the paintings, depending upon the particular facility of the installtaion. The steel panels are movable in the rails across the window opening. The panels effect protetcion for those within the structure from the possibility of flying glass or missiles, should the structure be the locale of a civil disturbance. The panels are also useful in the case of severe storms. Suitable knobs 124 and latches 126 may be attached to the panels for convenience in moving the panels.

In FIG. 10 a structural unit 131 comprises four vertical precast, prestressed concrete panels 133, 134, 135, 136. The panels rest upon a ground slab 137. A roof panel 138 is secured to all four of the panels, as is the ground slab.

Preferably, each of the vertical panels, the roof panel and ground slab is prestressed lightweight aggregate, cast either on the site or remote from the site. The panels and slab may be quickly assembled and secured in place by means of fasteners like the cast-in-place T-bars 141. Mating beads and recesses in the various panels as at 143 may provide mechanical keying for joining. Mortar may be used along all joints.

A vault door 145 suspended from rails 147, 148 by rollers 149 is movable to and from door opening 151, giving access to the structure. Storage facilities, such as the shelving 153, may reside within the building, as may valuable materials, such as special machinery, furs, expensive fabricated products, etc.

The vault is secured against entry by a multiplicity of frangible gas-filled tubes, such as those tubes 41 of FIG. 3 cast in the panels at the time that they are fabricated. As can be seen in FIG. 10, the tubes may extend horizontally, as shown by tubes 41A in side panel 135, or they may extend vertically as do tubes 41B in that panel. Both floor slab and roof panel also contain frangible gas-filled tubes. The tubes may be randomly spaced with respect to panel 138. They may also be spaced in a uniform plane, as shown with respect to ground slab 137. In either case, their disposition within the slab is such that no entry can be made by rupturing the slab without encountering a frangible tube.

The foregoing embodiments of the invention disclose only a few of the many modifications possible within the

I claim:

1. Entry inhibiting apparatus for a structure opening comprising a plurality of elongate barriers extending across the opening at spaced intervals calculated to preclude passage of a person therebetween; means anchoring each barrier at each of its ends to the structure including an outer shell, a hollow fastener securing the shell to the structure, a gas-filled cartridge within the shell connecting to one end of the hollow fastener such that severance of the fastener releases the gas within the cartridge at the point of severance, a filler and filler plug within the shell entering the barrier, a hardened pour within the shell surrounding the gas cartridge and the filler and the end of the barrier, and a bleeder channel extending from the filler to the exterior of the shell adjacent the barrier; a frangible tube within each barrier extending the length of the barrier, and an activity-inhibiting gas contained within the tube under pressure greater than atmospheric.

References Cited

UNITED STATES PATENTS

| | | | |
|---|---|---|---|
| 886,129 | 4/1908 | Jackson et al. | 52—727 |
| 2,125,807 | 8/1938 | Petty | 52—727 |
| 2,292,954 | 8/1942 | Martin | 109—29 |
| 2,940,294 | 6/1960 | Carlson | 52—285 |
| 3,200,554 | 8/1965 | Goodman et al. | 52—727 |

FOREIGN PATENTS 75,947  10/1917  Switzerland.

FRANK L. ABBOTT, Primary Examiner

S. D. BURKE III, Assistant Examiner

U.S. Cl. X.R.

52—106, 727